(12) United States Patent
Malladi et al.

(10) Patent No.: US 9,143,288 B2
(45) Date of Patent: Sep. 22, 2015

(54) VARIABLE CONTROL CHANNEL FOR A WIRELESS COMMUNICATION SYSTEM

(75) Inventors: Durga Prasad Malladi, San Diego, CA (US); Serge Willenegger, Onnens (CH)

(73) Assignee: QUALCOMM Incorporated, San Diego, CA (US)

(*) Notice: Subject to any disclaimer, the term of this patent is extended or adjusted under 35 U.S.C. 154(b) by 1013 days.

(21) Appl. No.: 11/781,925

(22) Filed: Jul. 23, 2007

(65) Prior Publication Data
US 2008/0095106 A1 Apr. 24, 2008

Related U.S. Application Data

(60) Provisional application No. 60/832,487, filed on Jul. 21, 2006, provisional application No. 60/833,054, filed on Jul. 24, 2006.

(51) Int. Cl.
*H04W 4/00* (2009.01)
*H04L 5/00* (2006.01)
(Continued)

(52) U.S. Cl.
CPC ............ *H04L 5/0007* (2013.01); *H04L 5/0055* (2013.01); *H04L 5/0057* (2013.01); *H04L 5/0058* (2013.01); *H04L 5/0092* (2013.01); *H04W 72/06* (2013.01); *H04W 74/002* (2013.01); *H04W 72/042* (2013.01)

(58) Field of Classification Search
CPC ... H04L 5/0007; H04L 5/0055; H04L 5/0057; H04L 5/0058; H04L 5/0092
USPC .................................. 370/329, 310, 335, 330
See application file for complete search history.

(56) References Cited

U.S. PATENT DOCUMENTS 5,732,353 A 3/1998 Haartsen
6,301,249 B1 * 10/2001 Mansfield et al. ............ 370/394
(Continued)

FOREIGN PATENT DOCUMENTS

EP 0888021 12/1998
EP 1605726 12/2005
(Continued)

OTHER PUBLICATIONS

Motorola, "E-UTRA Control Channel Design and TP", 3GPP TSG RANWG1 #44, Feb. 2006.*
(Continued)

*Primary Examiner* — Opiribo Georgewill
(74) *Attorney, Agent, or Firm* — Peng Zhu

(57) ABSTRACT

Techniques for sending control information on a variable control channel are described. Different structures for mapping control information to control channel resources may be used depending on various factors such as operating configuration, the available resources for the control channel, the type(s) of control information being sent, the amount of control information being sent for each type, whether or not data is being sent, etc. In one design, at least one type of control information being sent may be determined and may comprise channel quality indicator (CQI) information, acknowledgement (ACK) information, and/or other types of control information. A structure of the control channel may be determined based on operating configuration (e.g., system configuration such as asymmetry of downlink and uplink allocations) and/or other factors. The at least one type of control information may be mapped to the resources for the control channel based on the structure.

42 Claims, 13 Drawing Sheets

(51) Int. Cl.
 *H04W 72/06* (2009.01)
 *H04W 74/00* (2009.01)
 *H04W 72/04* (2009.01)

(56) References Cited

U.S. PATENT DOCUMENTS

| | | | |
|---|---|---|---|
| 6,724,740 B1* | 4/2004 | Choi et al. | 370/335 |
| 7,813,322 B2 | 10/2010 | Laroia et al. | |
| 2002/0080806 A1* | 6/2002 | Haggard Ljungqvist | 370/401 |
| 2002/0141367 A1* | 10/2002 | Hwang et al. | 370/335 |
| 2003/0108013 A1* | 6/2003 | Hwang et al. | 370/335 |
| 2004/0151198 A1 | 8/2004 | Brown et al. | |
| 2005/0174982 A1* | 8/2005 | Uehara et al. | 370/345 |
| 2006/0034277 A1* | 2/2006 | Jang et al. | 370/389 |
| 2006/0050676 A1 | 3/2006 | Mansour | |
| 2006/0262871 A1 | 11/2006 | Cho et al. | |
| 2007/0171849 A1* | 7/2007 | Zhang et al. | 370/310 |
| 2007/0171864 A1* | 7/2007 | Zhang et al. | 370/329 |
| 2007/0171995 A1 | 7/2007 | Muharemovic et al. | |
| 2007/0248041 A1 | 10/2007 | Seki | |
| 2008/0090528 A1 | 4/2008 | Malladi | |
| 2013/0142149 A1 | 6/2013 | Malladi | |

FOREIGN PATENT DOCUMENTS

| | | |
|---|---|---|
| JP | 11088304 A | 3/1999 |
| JP | 2006033778 A | 2/2006 |
| JP | 2006070466 A | 3/2006 |
| JP | 2009543528 | 12/2009 |
| KR | 20050061599 A | 6/2005 |
| KR | 20060008862 A | 1/2006 |
| RU | 2198474 | 2/2003 |
| RU | 2258314 | 10/2005 |
| TW | 200425754 | 11/2004 |
| TW | 200518607 | 6/2005 |
| TW | 200614828 | 5/2006 |
| TW | 200618645 | 6/2006 |
| WO | WO2005015801 | 2/2005 |
| WO | WO2005117385 | 8/2005 |
| WO | WO2006015334 A1 | 2/2006 |
| WO | WO2007084482 A2 | 7/2007 |
| WO | 2008006088 | 1/2008 |

OTHER PUBLICATIONS

International Search Report—PCT/US07/074246, International Search Authority—European Patent Office, Dec. 28, 2007.
Written Opinion—PCT/US07/074246, International Searching Authority—European Patent Office, Dec. 28, 2007.
3rd Generation Partnership Project: "Physical layer aspects for evolved Universal Terrestrial Radio Access (UTRA), Release 7" (Online) Jun. 15, 2006, pp. 67-78, XP002474356.
Branislav M Popovic: "Spreading Sequences for Multicarrier CDMA Systems" IEEE Transactions on Communications, vol. 47, No. 6, (Jun. 1, 1999), pp. 918-926, XP011009440.
Byoung-Jo Choi et al: "Crest-factor study of MC-CDMA and OFDM" Vehicular Technology Conference, 199. VTC 1999-Fall. IEEE VTS 50th Amsterdam, Netherlands Sep. 19-22, 1999, Piscataway, NJ, USA, IEEE, US, vol. 1, pp. 233-237, XP010352874.
Carni E et al: "Synchronous CDMA Based on the Cyclical Translations of a CAZAC Sequence" Wireless Communication Systems, 2005. 2nd International Symposium on Siena, Italy Sep. 5-9, 2005, Piscataway, NJ, USA, IEEE, pp. 442-446, XP010886290.
Huawei: "Further consideration on multiplexing method if Shared Control Channel in Uplink Single-Carrier FDMA" Internet Citation, [Online]Nov. 7, 2005, XP002451165, Seoul, Korea, Retrieved from the Internet: URL:http//www.3gpp.org/ftp/tsg_ran/WG1_RL1/TSGR1.
Kawamura T et al: "Layer 1 / Layer 2 control channel structure in single-carrier FDMA based evolved UTRA uplink" Proceedings of the IEEE Vehicular Technology Conference, Apr. 22, 2007, pp. 2941-2945, XP002483429.
Kobayashi H et al: "Proposal of single carrier OFDM technique with adaptive modulation method" The 57th IEEE Semiannual Vehicular Technology Conference Held in Jeju, Korea, vol. 4, Apr. 22, 2003-Apr. 25, 2003 pp. 1915-1919.
Motorola: "Uplink Control Signaling Considerations for E-UTRA" 3GPP TSG RAN WG1 #45, (Online) May 8, 2006-May 12, 2006 XP002474358.
Qualcomm Europe: "Link Analysis of ACK Channel in Uplink" 3GPP TSG RAN WG1#45, [Online] May 8, 2006, pp. 1-8, XP002483430, Shanghai, China, Retrieved from the Internet: URL:http://www.3gpp.org/ftp/tsg_ran/WG1_RL1/TSGR1_45/Docs/R1-061517.zip> [retrieved.
Samsung: "Data and Control Multiplexing in DFT-S-OFDM" 3GPP TSG RAN WG1 # 42BIS, [Online] Oct. 10, 2005, pp. 1-5, XP002451166 San Diego, USA Retrieved from the Internet: URL:http://www.3gpp.org/ftp/tsg_ran/WG1_RL1/TSGR1_42bis/Docs/R1-051039.
Inter Digital: "Scheduling and Multiplexing of CQI and ACK/NACK Feedback for Single Carrier FDMA in Evolved UTRA Uplink", 3GPP, R1-060852, Mar. 31, 2006.
Motorola: "E-UTRA Uplink Control Signaling + TP", 3GPP R1-061172,Mar. 12, 2006.
Qualcomm Europe: "Structure and link analysis UL control signaling", 3GPP R1-062709, Oct. 13, 2006.
Branislav M Popovic: Spreading Sequence for Multi-Carrier CDMA Systems IEE colloquiums on CDMA techniques and Applications for Third Generation Mobile Systems (1997).
NTT DoCoMo et. al., "Data-non-associated L1/L2 Control Channel Structure for E-UTRA Uplink",3GPP TSG RAN WG1 LTE Ad Hoc R1-061675, Jun. 30, 2006, pp. 1-6.
Scheduling and Multiplexing of CQI and ACK/NACK Feedback for Single Carrier FDMA in Evolved UTRA Uplink, TSG-RAN WG1 WG1 LTE Ad Hoc Meeting R1-060155, Jan. 23, 2006.
Taiwan Search Report—TW096126938—TIPO—May 6, 2011.

* cited by examiner

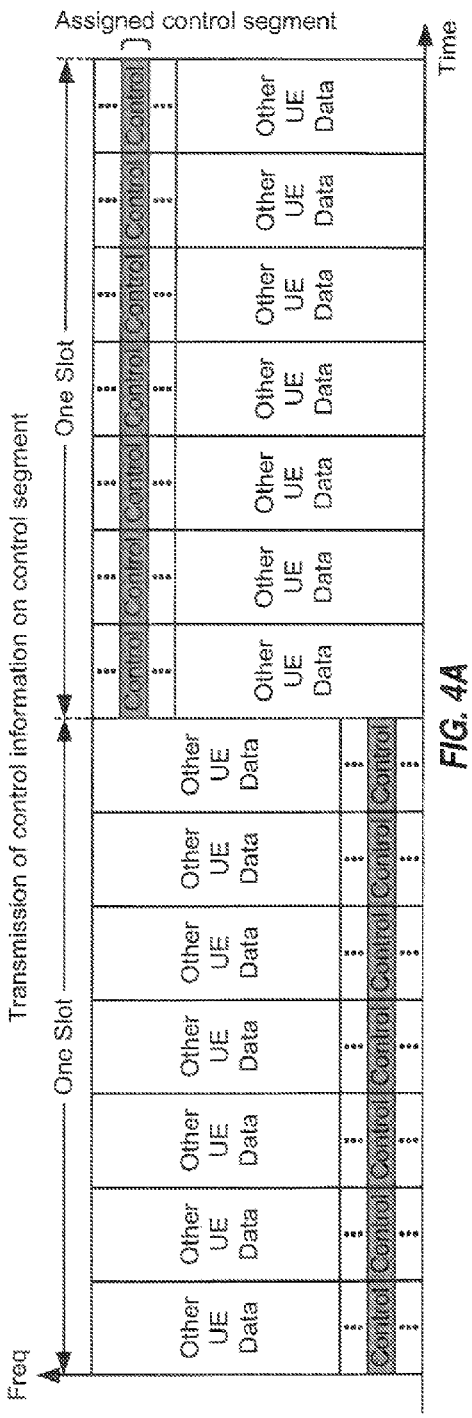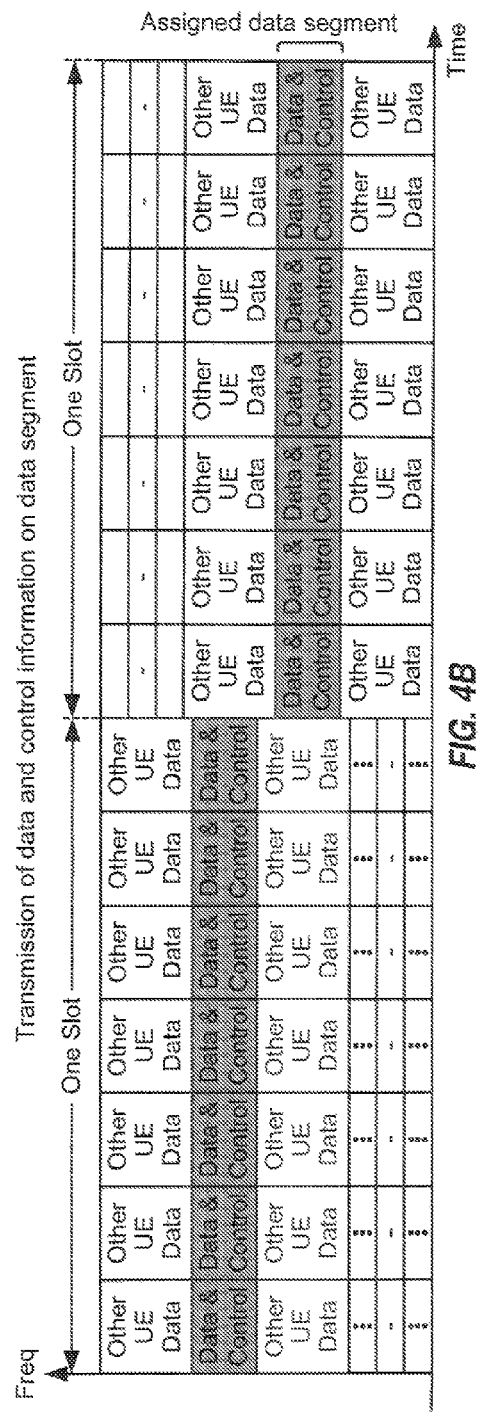

Sending only ACK Information on Control Segment

712

| | Slot T1 | Slot T2 |
|---|---|---|
| VFR S1 | ACK1 | ACK1 |
| VFR S2 | ACK1 | ACK1 |

ACK Information for One HARQ Process

714

| | Slot T1 | Slot T2 |
|---|---|---|
| VFR S1 | ACK1 | ACK1 |
| VFR S2 | ACK2 | ACK2 |

ACK Information for Two HARQ Processes

716

| | Slot T1 | Slot T2 |
|---|---|---|
| VFR S1 | ACK1 | ACK3 |
| VFR S2 | ACK2 | ACK 1/2/3 |

ACK Information for Three HARQ Processes

*FIG. 7A*

Sending CQI & ACK Information on Control Segment

722

| | Slot T1 | Slot T2 |
|---|---|---|
| VFR S1 | CQI | CQI |
| VFR S2 | ACK1 | ACK1 |

CQI & ACK Information for One HARQ Process

724

| | Slot T1 | Slot T2 |
|---|---|---|
| VFR S1 | CQI | CQI |
| VFR S2 | ACK1 | ACK2 |

CQI & ACK Information for Two HARQ Processes

726

| | Slot T1 | Slot T2 |
|---|---|---|
| VFR S1 | CQI | ACK2 |
| VFR S2 | ACK1 | ACK3 |

CQI & ACK Information for Three HARQ Processes

| | Slot T1 | Slot T2 |
|---|---|---|
| VFR S1 | CQI | CQI |
| VFR S2 | CQI | CQI |

CQI Information Only

Sending ACK Information and Data on Data Segment

*732 — ACK Information for One HARQ Process*

| | Slot T1 | Slot T2 |
|---|---|---|
| VFR S1' | ACK1 | ACK1 |
| VFR S2' | Data | Data |
| VFR S3' | Data | Data |
| VFR S4' | Data | Data |
| ... | ... | ... |
| VFR SK' | Data | Data |

*734 — ACK Information for Two HARQ Processes*

| | Slot T1 | Slot T2 |
|---|---|---|
| VFR S1' | ACK1 | ACK1 |
| VFR S2' | ACK2 | ACK2 |
| VFR S3' | Data | Data |
| VFR S4' | Data | Data |
| ... | ... | ... |
| VFR SK' | Data | Data |

*736 — ACK Information for Three HARQ Processes*

| | Slot T1 | Slot T2 |
|---|---|---|
| VFR S1' | ACK1 | ACK3 |
| VFR S2' | ACK2 | ACK2 |
| VFR S3' | ACK3 | ACK3 |
| VFR S4' | Data | Data |
| ... | ... | ... |
| VFR SK' | Data | Data |

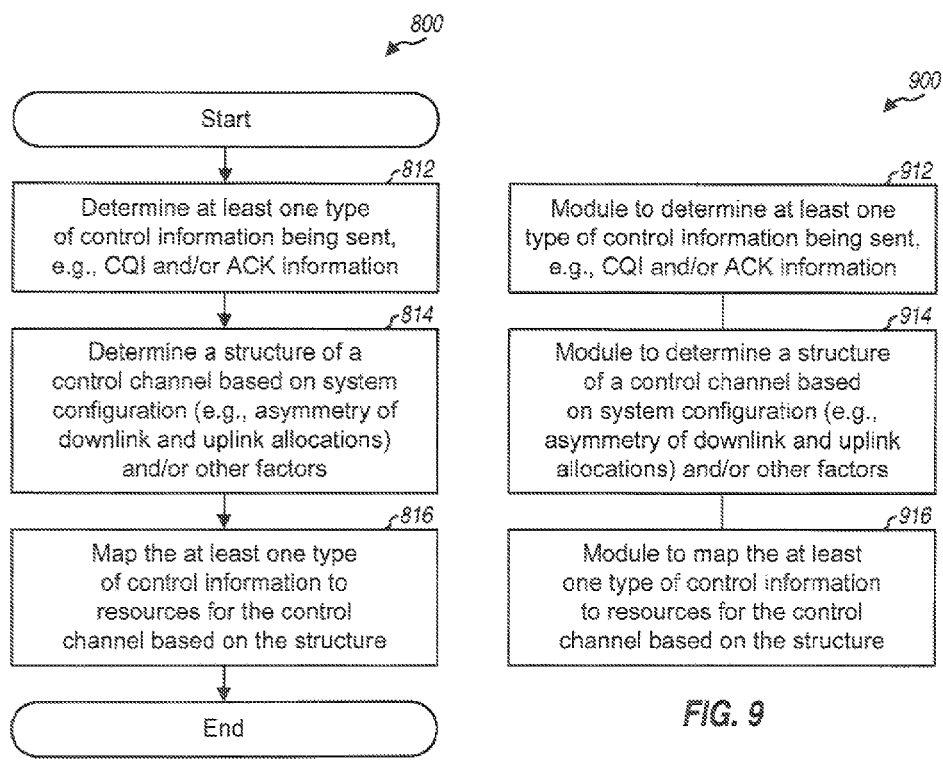

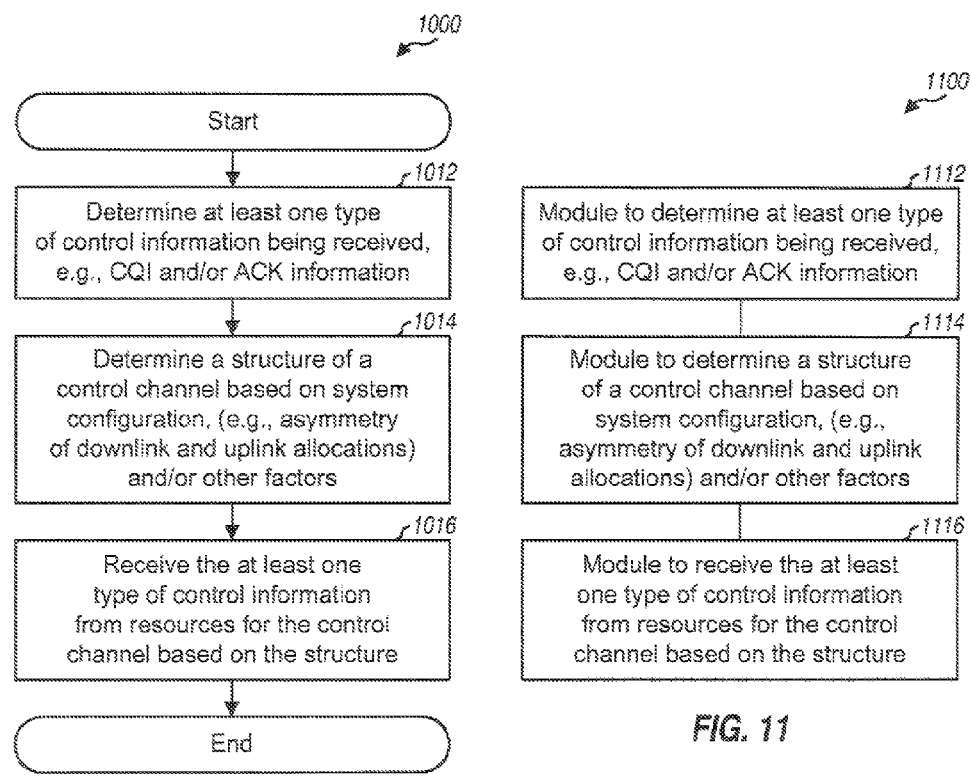

VARIABLE CONTROL CHANNEL FOR A WIRELESS COMMUNICATION SYSTEM

The present application claims priority to provisional U.S. Application Ser. No. 60/832,487, entitled "METHOD AND APPARATUS FOR VARIABLE CONTROL CHANNEL STRUCTURE FOR ASYMMETRIC DOWNLINK AND UPLINK ALLOCATIONS," filed Jul. 21, 2006, and U.S. Application Ser. No. 60/833,054, entitled "A METHOD AND APPARATUS FOR VARIABLE CONTROL CHANNEL STRUCTURE FOR ASYMMETRIC DOWNLINK AND UPLINK LOCATIONS," filed Jul. 24, 2006, both assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B (or base station) may transmit data to a user equipment (UE) on the downlink and/or receive data from the UE on the uplink. The downlink (or forward link) refers to the communication link from the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or for other purposes. It is desirable to send data and control information as efficiently as possible in order to improve system performance.

SUMMARY

Techniques for sending control information on a variable control channel are described herein. The variable control channel may support transmission of one or more types of control information with a variable amount of resources. Different structures for mapping control information to resources may be used depending on various factors such as operating configuration, the available resources for the control channel, the type(s) of control information being sent, the amount of control information being sent for each type, whether or not data is being sent, etc. The structure of the control channel may thus be varied depending on these various factors.

In one design, at least one type of control information being sent may be determined and may comprise only channel quality indicator (CQI) information, only acknowledgement (ACK) information, both CQI and ACK information, and/or other types of control information. A structure of the control channel may be determined based on operating configuration and/or other factors. The operating configuration may be determined based on system configuration, UE configuration, etc. The system configuration may indicate the number of subframes allocated for the downlink and the number of subframes allocated for the uplink. The UE configuration may indicate downlink and uplink subframes applicable for the UE among the allocated subframes. The control channel structure may be determined based on asymmetry of the downlink and uplink allocations. In one design, the control channel may comprise (i) a fixed amount of resources from a control segment if data is not being sent or (ii) a variable amount of resources from a data segment if data is being sent. The at least one type of control information may be mapped to the resources for the control channel based on the structure. Each type of control information may be mapped to a respective portion of the control channel resources based on the structure.

Various aspects and features of the disclosure are described in further detail below.

BRIEF DESCRIPTION OF THE DRAWINGS

FIG. 4A shows transmission of only control information.

FIG. 4B shows transmission of data and control information.

FIGS. 7A and 7B show control channel structures for sending CQI and/or ACK information on a control segment.

FIGS. 7C and 7D show control channel structures for sending CQI and/or ACK information on a data segment.

FIG. 8 shows a process for sending control information.

FIG. 9 shows an apparatus for sending control information.

FIG. 10 shows a process for receiving control information.

FIG. 11 shows an apparatus for receiving control information.

DETAILED DESCRIPTION

Figure 1:
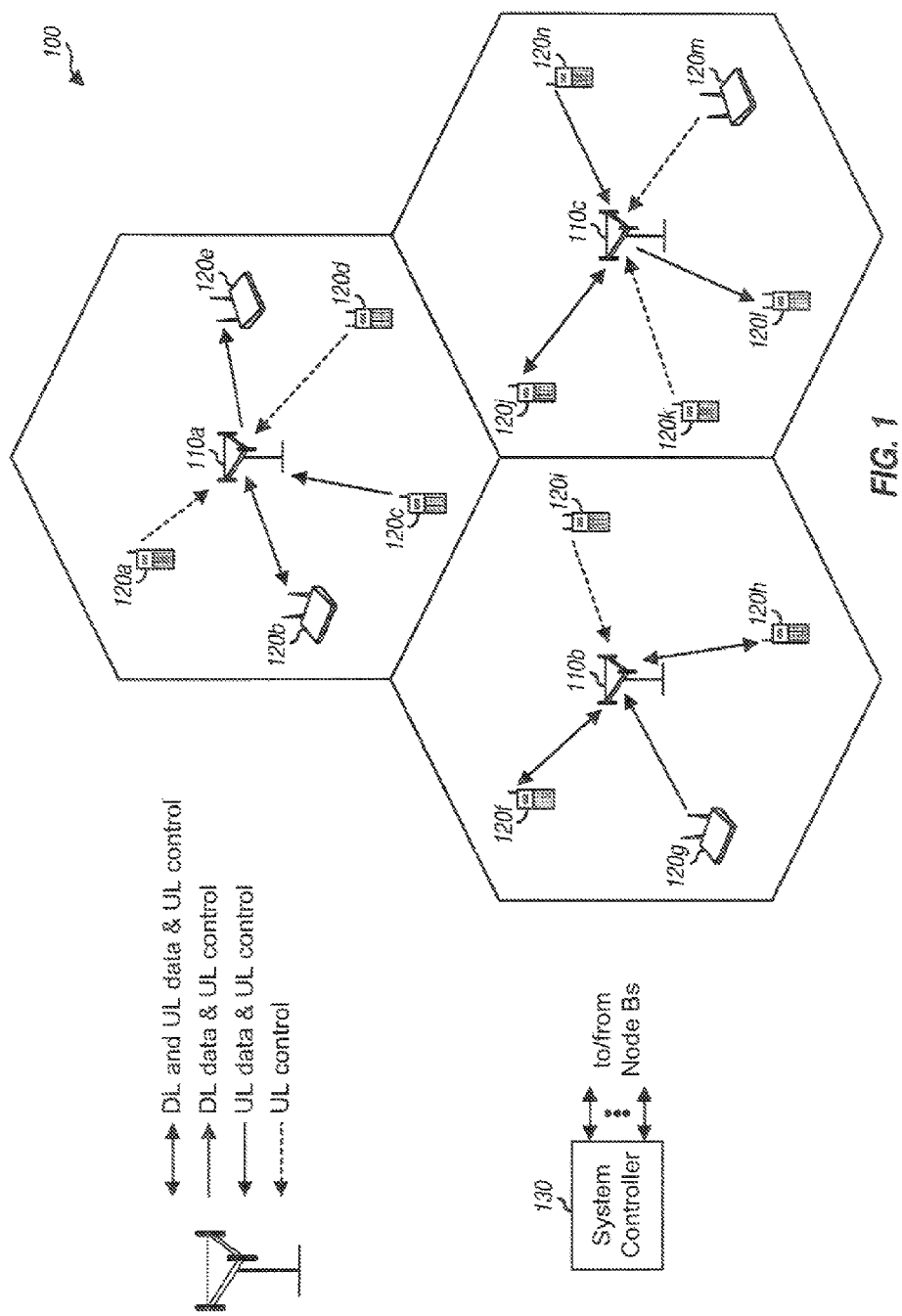
FIG. 1 shows a wireless communication system.

FIG. 1 shows a wireless communication system 100 with multiple Node Bs 110 and multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. A system controller 130 may couple to the Node Bs and provide coordination and control for these Node Bs. System controller 130 may be a single network entity or a collection of network entities, e.g., a Mobility Management Entity (MME)/System Architecture Evolution (SAE) Gateway, a Radio Network Controller (RNC), etc.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless communication device, a handheld device, a wireless modem, a laptop computer, etc.

A Node B may transmit data to one or more UEs on the downlink and/or receive data from one or more UEs on the uplink at any given moment. The Node B may also send control information to the UEs and/or receive control information from the UEs. In FIG. 1, a solid line with double arrows (e.g., between Node B 110a and UE 120b) represents data transmission on the downlink and uplink, and transmission of control information on the uplink. A solid line with a single arrow pointing to a UE (e.g., UE 120e) represents data transmission on the downlink, and transmission of control information on the uplink. A solid line with a single arrow pointing from a UE (e.g., UE 120c) represents transmission of data and control information on the uplink. A dashed line with a single arrow pointing from a UE (e.g., UE 120a) represents transmission of control information (but no data) on the uplink. Transmission of control information on the downlink is not shown in FIG. 1 for simplicity. A given UE may receive data on the downlink, transmit data on the uplink, and/or transmit control information on the uplink at any given moment.

Figure 2:
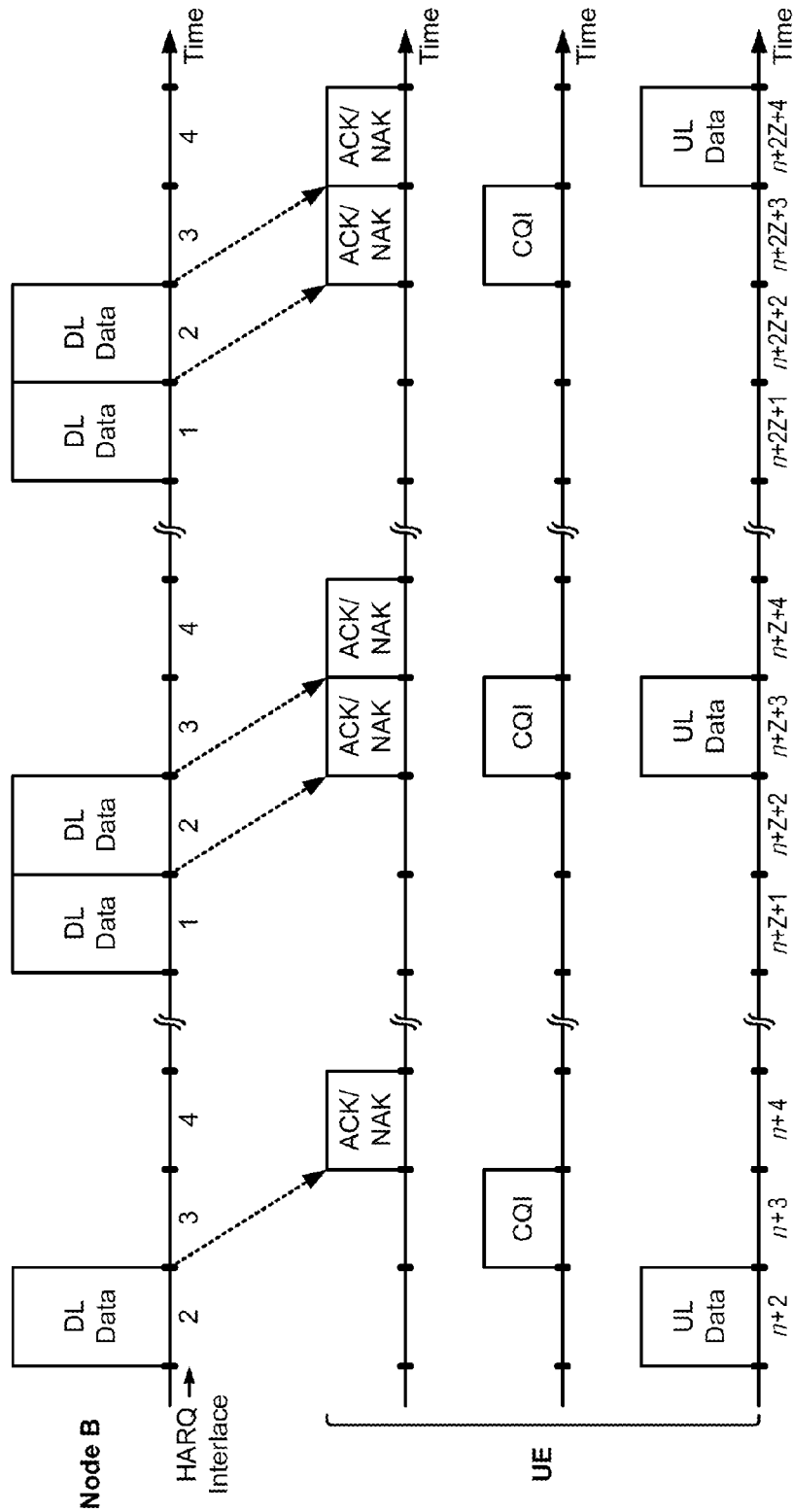
FIG. 2 shows example transmissions on the downlink and uplink.

FIG. 2 shows example downlink transmission by a Node B and uplink transmission by a UE. The UE may periodically estimate the downlink channel quality for the Node B and may send CQI information to the Node B. The Node B may use the CQI information to select a suitable rate (e.g., a code rate and a modulation scheme) for downlink (DL) data transmission to the UE. The Node B may process and transmit data to the UE when there is data to send and system resources are available. The UE may process a downlink data transmission from the Node B and may send an acknowledgement (ACK) if the data is decoded correctly or a negative acknowledgement (NAK) if the data is decoded in error. The Node B may retransmit the data if a NAK is received and may transmit new data if an ACK is received. The UE may also transmit data on the uplink (UL) to the Node B when there is data to send and the UE is assigned uplink resources.

As shown in FIG. 2, the UE may transmit data and/or control information, or neither, in any given time interval. The control information may also be referred to as control, overhead, signaling, etc. The control information may comprise ACK/NAK, CQI, other information, or any combination thereof. The type and amount of control information may be dependent on various factors such as the number of data streams being sent, whether multiple-input multiple-output (MIMO) is used for transmission, etc. For simplicity, much of the following description assumes that control information comprises CQI and ACK information.

The system may support hybrid automatic retransmission (HARQ), which may also be referred to as incremental redundancy, chase combining, etc. For HARQ on the downlink, the Node B may send a transmission for a packet and may send one or more retransmissions until the packet is decoded correctly by the UE, or the maximum number of retransmissions has been sent, or some other termination condition is encountered. HARQ may improve reliability of data transmission.

Z HARQ interlaces may be defined, where Z may be any integer value. Each HARQ interlace may include time intervals that are spaced apart by Z time intervals. For example, six HARQ interlaces may be defined, and HARQ interlace z may include time intervals n+z, n+z+6, n+z+12, etc., for $z \in \{1, \ldots, 6\}$.

An HARQ process may refer to all transmission and retransmissions, if any, for a packet. An HARQ process may be started when resources are available and may terminate after the first transmission or after one or more subsequent retransmissions. An HARQ process may have a variable duration that may depend on the decoding results at the receiver. Each HARQ process may be sent on one HARQ interlace. In one design, up to Z HARQ processes may be sent on the Z HARQ interlaces. In another design, multiple HARQ processes may be sent on different resources (e.g., on different sets of subcarriers or from different antennas) in the same HARQ interlace.

The transmission techniques described herein may be used for uplink transmission as well as downlink transmission. The techniques may also be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

Figure 3:
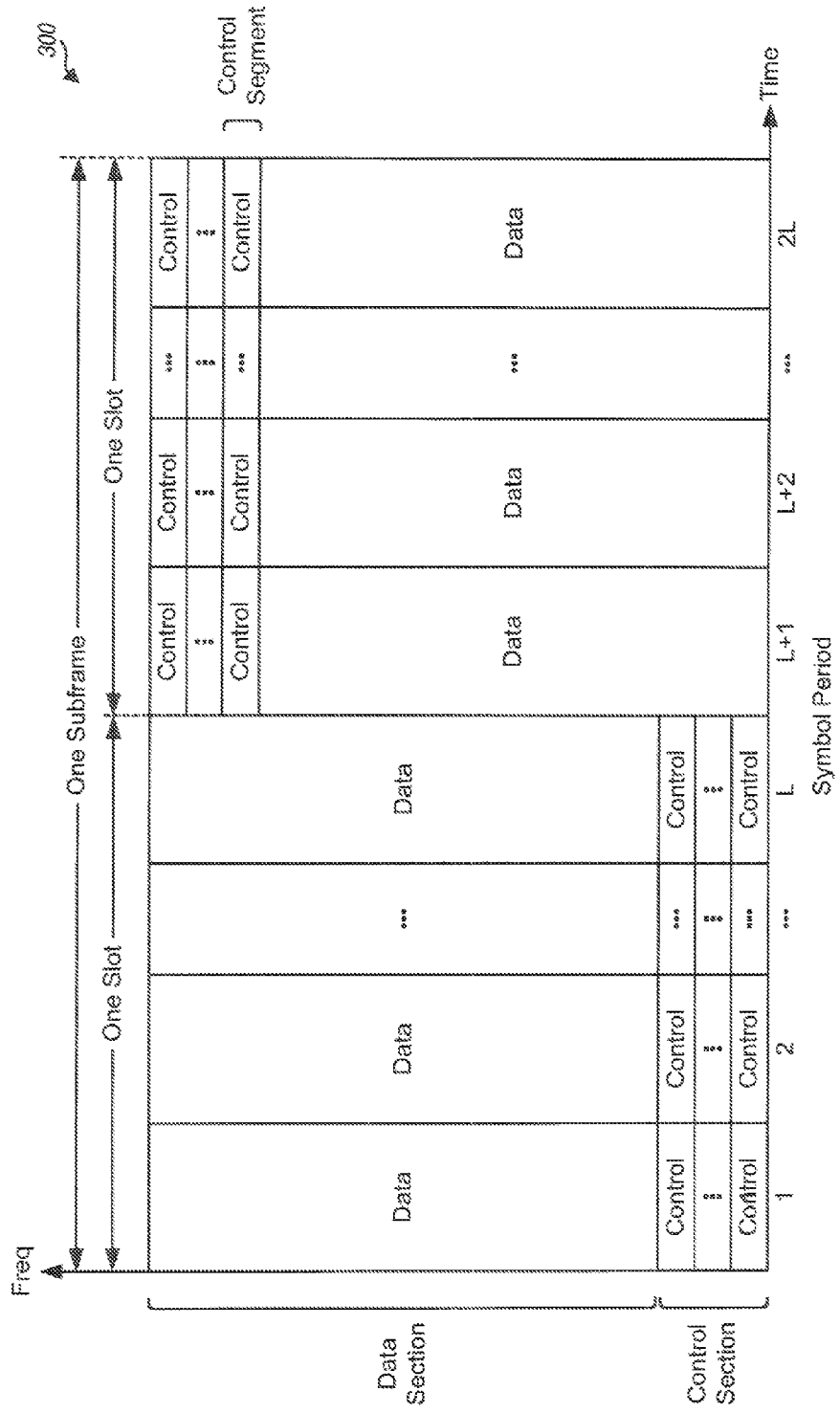
FIG. 3 shows a structure for sending data and control information.

FIG. 3 shows a design of a structure 300 that may be used for sending data and control information on the uplink. The transmission timeline may be partitioned into subframes. A subframe may have a fixed duration, e.g., one millisecond (ms), or a configurable duration. A subframe may be partitioned into two slots, and each slot may include L symbol periods, where L may be any integer value, e.g., L=6 or 7. Each symbol period may be used for data, control information, pilot, or any combination thereof.

In the design shown in FIG. 3, the N total subcarriers may be divided into a data section and a control section. The control section may be formed at an edge of the system bandwidth, as shown in FIG. 3. The control section may have a configurable size, which may be selected based on the amount of control information being sent on the uplink by the UEs. The data section may include all subcarriers not included in the control section. The design in FIG. 3 results in the data section including contiguous subcarriers, which allows a single UE to be assigned all of the contiguous subcarriers in the data section.

A UE may be assigned a control segment of M contiguous subcarriers, where M may be a fixed or configurable value. A control segment may also be referred to as a physical uplink control channel (PUCCH). In one design, a control segment may include an integer multiple of 12 subcarriers. The UE may also be assigned a data segment of Q contiguous subcarriers, where Q may be a fixed or configurable value. A data segment may also be referred to as a physical uplink shared channel (PUSCH). In one design, a data segment may include an integer multiple of 12 subcarriers. The UE may also be assigned no data segment or no control segment in a given subframe.

It may be desirable for a UE to transmit on contiguous subcarriers using SC-FDM, which is referred to as localized frequency division multiplexing (LFDM). Transmitting on contiguous subcarriers may result in a lower peak-to-average ratio (PAR). PAR is the ratio of the peak power of a waveform to the average power of the waveform. A low PAR is desirable since it may allow a power amplifier (PA) to be operated at an average output power closer to the peak output power. This, in turn, may improve throughput and/or link margin for the UE.

The UE may be assigned a control segment located near an edge of the system bandwidth. The UE may also be assigned a data segment within the data section when there is data to send. The subcarriers for the control segment may not be adjacent to the subcarriers for the data segment. The UE may send control information in the control segment if there is no data to send on the uplink. The UE may send data and control information in the data segment if there is data to send on the uplink. This dynamic transmission of control information may allow the UE to transmit on contiguous subcarriers regardless of whether or not data is being sent, which may improve PAR.

FIG. 4A shows transmission of control information in a subframe when there is no data to send on the uplink. The UE may be assigned a control segment, which may be mapped to different sets of subcarriers in the two slots of the subframe. The UE may send control information on the assigned subcarriers for the control segment in each symbol period. The remaining subcarriers may be used by other UEs for uplink transmission.

FIG. 4B shows transmission of data and control information when there is data to send on the uplink. The UE may be assigned a data segment, which may be mapped to different sets of subcarriers in the two slots of a subframe. The UE may send data and control information on the assigned subcarriers for the data segment in each symbol period. The remaining subcarriers may be used by other UEs for uplink transmission.

FIGS. 4A and 4B show frequency hopping from slot to slot. Frequency hopping may also be performed over other time intervals, e.g., from symbol period to symbol period, from subframe to subframe, etc. Frequency hopping may provide frequency diversity against deleterious path effects and randomization of interference.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods.

Figure 5:
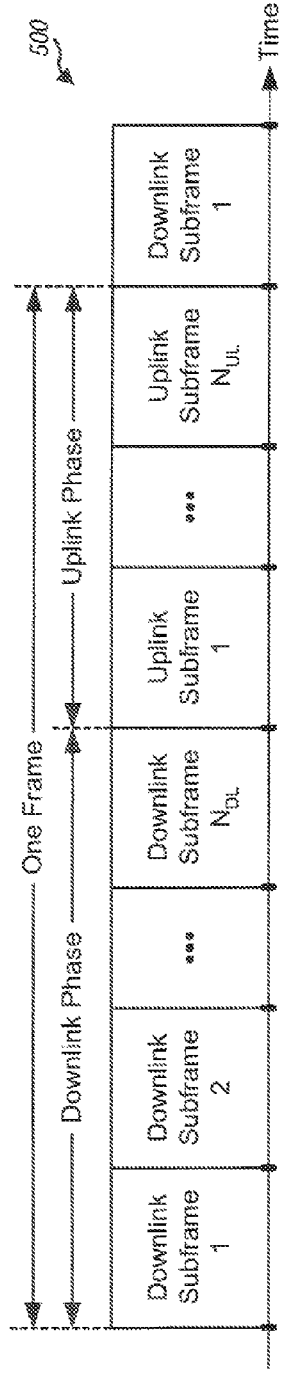
FIG. 5 shows a time structure for a time division duplex (TDD) mode.

FIG. 5 shows a time structure 500 that may be used for the TDD mode. The transmission timeline may be partitioned into units of frames. Each frame may span a predetermined time duration, e.g., 10 ms, and may be partitioned into a predetermined number of subframes. In each frame, $N_{DL}$ subframes may be allocated for the downlink, and $N_{UL}$ subframes may be allocated for the uplink. $N_{DL}$ and $N_{UL}$ may be any suitable values and may be configurable based on traffic loads for the downlink and uplink and/or other considerations.

The downlink and uplink may have symmetric or asymmetric allocations depending on the system configuration. For symmetric downlink and uplink allocations, the number of downlink subframes is equal to the number of uplink subframes, or $N_{DL}=N_{UL}$. Each downlink subframe may be associated with a corresponding uplink subframe. For example, a data transmission may be sent in downlink subframe n, and control information for the data transmission may be sent in the corresponding uplink subframe n, where $n \in \{1, \ldots, N_{DL}\}$. For asymmetric downlink and uplink allocations, the number of downlink subframes does not match the number of uplink subframes, or $N_{DL} \neq N_{UL}$. Hence, there may not be a one-to-one mapping between downlink and uplink subframes. Asymmetric allocations may allow for more flexible allocation of system resources to match loading conditions but may complicate system operation.

Figure 6:
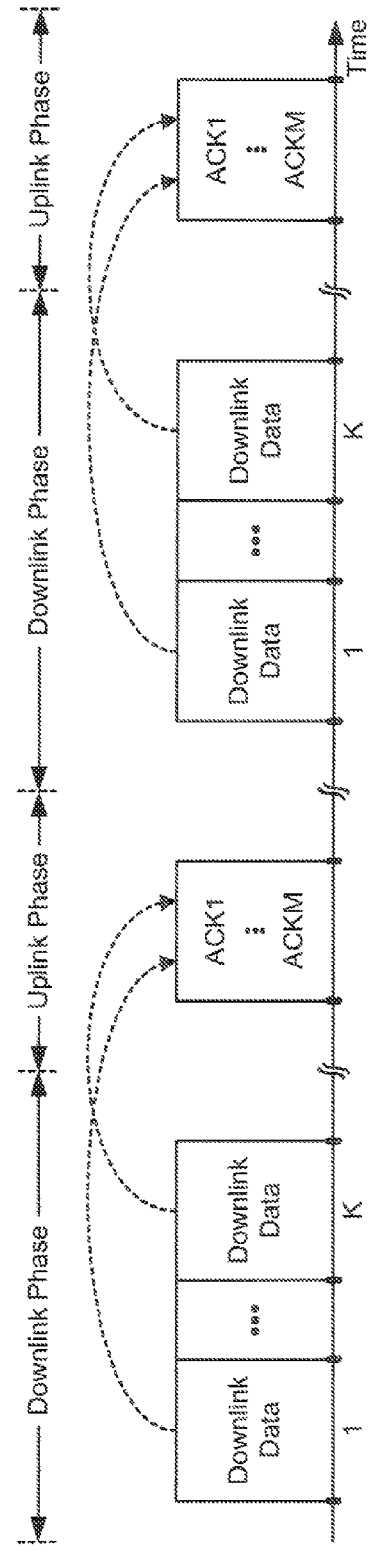
FIG. 6 shows transmission with asymmetric downlink and uplink allocations.

FIG. 6 shows an example data transmission with asymmetric downlink and uplink allocations. In this example, M downlink subframes 1 through M may be associated with a single uplink subframe, where M may be any integer value. A UE may be assigned resources in downlink subframes 1 through M as well as the associated uplink subframe. M packets may be sent on M HARQ processes in the M downlink subframes to the UE. The UE may decode each packet and determine ACK information for the packet. The ACK information may also be referred to as ACK feedback and may comprise ACK or NAK. The UE may send ACK information for all M packets in the uplink frame. In FIG. 6, ACK1 is the ACK information for the packet sent on HARQ process H1, and ACKM is the ACK information for the packet sent on HARQ process HM, where H1 through HM may be any available HARQ processes. The ACK information may be used to control transmission of new packets or retransmission of packets decoded in error.

In an aspect, a variable control channel may be used to support both symmetric and asymmetric downlink and uplink allocations. The control channel may be allocated different amounts of resources, e.g., depending on whether or not data is being sent. The control channel may be used to flexibly send different types of control information and/or different amounts of control information.

For clarity, specific designs of the variable control channel are described below. In these designs, the control channel may be allocated four resource units in a control segment when data is not being sent and may be allocated a variable number of resource units in a data segment when data is being sent. A resource unit may correspond to physical resources or logical resources. Physical resources may be resources used for transmission and may be defined by subcarriers, symbol periods, etc. Logical resources may be used to simplify resource allocation and may be mapped to physical resources based on a mapping, a transformation, etc. A resource unit may have any dimension and may be used to send one or more bits of control information. In the following designs, the control channel may be used to send only CQI information, or only ACK information for up to three HARQ processes, or both CQI and ACK information, or no control information.

FIG. 7A shows designs of control channel structures for sending ACK information for up to three HARQ processes on the control segment when CQI and data are not sent. In FIG. 7A, the four resource units for the control segment may be represented by a 2×2 matrix. The first and second rows of the matrix may correspond to two virtual frequency resources (VFR) S1 and S2, respectively. A VFR may be a set of subcarriers, may be mapped to a set of subcarriers, or may correspond to some other logical or physical resources. The first and second columns of the matrix may correspond to two slots T1 and T2, respectively, of one subframe. The four blocks of the 2×2 matrix may correspond to four resource units for the control channel. In the following description, H1, H2 and H3 may be any three different HARQ processes.

In one design, the ACK information for one HARQ process H1 (ACK1) may be sent on all four resource units for the control segment as shown by a structure 712. For example, the ACK information may be repeated four times and sent on all four resource units to improve reliability.

In one design, the ACK information for two HARQ processes H1 and H2 may be sent on the four resource units for the control segment as shown by a structure 714. In this design, the ACK information for HARQ process H1 (ACK1) may be sent on two resource units occupying VFR S1 in slots T1 and T2. The ACK information for HARQ process H2 (ACK2) may be sent on two resource units occupying VFR S2 in slots T1 and T2.

In one design, the ACK information for three HARQ processes H1, H2 and H3 may be sent on the four resource units for the control segment as shown by a structure 716. In this design, the ACK information for HARQ process H1 (ACK1) may be sent on one resource unit occupying VFR S1 in slot T1. The ACK information for HARQ process H2 (ACK2) may be sent on one resource unit occupying VFR S2 in slot T1. The ACK information for HARQ process H3 (ACK3) may be sent on one resource unit occupying VFR S1 in slot T2. The remaining resource unit may be shared by the three HARQ processes in a time division multiplexed (TDM) manner. For example, this resource unit may be used for the ACK information for HARQ process H1 in one subframe, then for the ACK information for HARQ process H2 in the next subframe, then for the ACK information for HARQ process H3 in the next subframe, etc. In another design, the ACK information for all three HARQ processes may be encoded with a (4, 3) block code and sent on all four resource units. The ACK information for the three HARQ processes may also be sent in other manners.

FIG. 7B shows designs of control channel structures for sending CQI and ACK information for up to three HARQ processes on the control segment when data is not sent. In one design, CQI information may be sent on all four resource units for the control segment, as shown by a structure 720, when no ACK information is sent.

In one design, the CQI and ACK information for one HARQ process H1 may be sent on the four resource units for the control segment as shown by a structure 722. In this design, the CQI information may be sent on two resource units occupying VFR S1 in slots T1 and T2. The ACK information for HARQ process H1 may be sent on two resource units occupying VFR S2 in slots T1 and T2.

In one design, the CQI and ACK information for two HARQ processes H1 and H2 may be sent on the four resource units for the control segment as shown by a structure 724. In this design, the CQI information may be sent on two resource units occupying VFR S1 in slots T1 and T2. The ACK information for HARQ process H1 may be sent on one resource unit occupying VFR S2 in slot T1. The ACK information for HARQ process H2 may be sent on one resource unit occupying VFR S2 in slot T2.

In one design, the CQI and ACK information for three HARQ processes H1, H2 and H3 may be sent on the four resource units for the control segment as shown by a structure 726. In this design, the CQI information may be sent on one resource unit occupying VFR S1 in slot T1. The ACK information for HARQ process H1 may be sent on one resource unit occupying VFR S2 in slot T1. The ACK information for HARQ process H2 may be sent on one resource unit occupying VFR S1 in slot T2. The ACK information for HARQ process H3 may be sent on one resource unit occupying VFR S2 in slot T2.

FIG. 7C shows designs of control channel structures for sending ACK information for up to three HARQ processes on the data segment when data is being sent but not CQI. The data segment may include 2K resource units and may be represented by a K×2 matrix, where K may be any value. The K rows of the matrix may correspond to K VFRs S1' through SK', where S1' may be the lowest index and SK' may be the highest index of the K VFRs for the data segment. The first and second columns of the matrix may correspond to two slots T1 and T2, respectively, of one subframe. The 2K blocks of the K×2 matrix may correspond to 2K resource units. A resource unit for the data segment may have the same or different dimension as a resource unit for the control segment. As shown in FIG. 7C, different numbers of resource units may be taken from the data segment and used to send different amounts of control information. The remaining resource units in the data segment may be used to send data.

In one design, the ACK information for one HARQ process H1 may be sent on two resource units for the data segment as shown by a structure 732. The two resource units may occupy VFR S1' in slots T1 and T2. The remaining 2K−2 resource units may be used for data.

In one design, the ACK information for two HARQ processes H1 and H2 may be sent on four resource units for the data segment as shown by a structure 734. In this design, the ACK information for HARQ process H1 may be sent on two resource units occupying VFR S1' in slots T1 and T2. The ACK information for HARQ process H2 may be sent on two resource units occupying VFR S2' in slots T1 and T2. The remaining 2K−4 resource units may be used for data.

In one design, the ACK information for three HARQ processes H1, H2 and H3 may be sent on six resource units for the data segment as shown by a structure 736. In this design, the ACK information for HARQ process H1 may be sent on two resource units occupying VFR S1' in slots T1 and T2. The ACK information for HARQ process H2 may be sent on two resource units occupying VFR S2' in slots T1 and T2. The ACK information for HARQ process H3 may be sent on two resource units occupying VFRs S3' for the data segment in slots T1 and T2. The remaining 2K−6 resource units may be used for data.

Figure 7D:
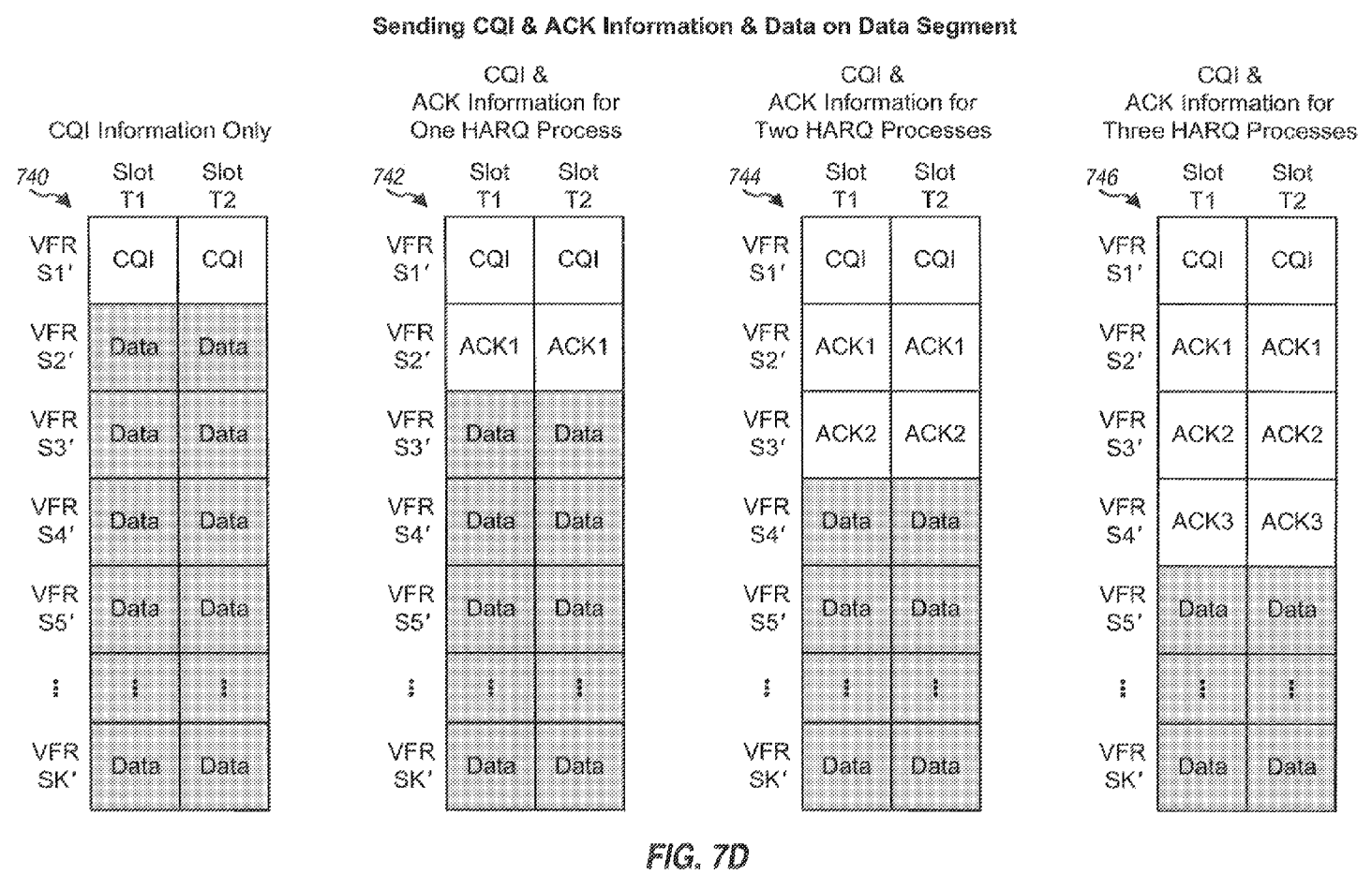

FIG. 7D shows designs of control channel structures for sending CQI and ACK information for up to three HARQ processes on the data segment when data is being sent. In one design, the CQI information may be sent on two resource units for the data segment as shown by a structure 740. These two resource units may occupy VFR S1' in slots T1 and T2. The remaining 2K−2 resource units may be used for data.

In one design, the CQI and ACK information for one HARQ process H1 may be sent on four resource units for the data segment as shown by a structure 742. In this design, the CQI information may be sent on two resource units occupying VFR S1' in slots T1 and T2. The ACK information for HARQ process H1 may be sent on two resource units occupying VFR S2' in slots T1 and T2. The remaining 2K−4 resource units may be used for data.

In one design, the CQI and ACK information for two HARQ processes H1 and H2 may be sent on six resource units for the data segment as shown by a structure 744. In this design, the CQI information may be sent on two resource units occupying VFR S1' in slots T1 and T2. The ACK information for HARQ process H1 may be sent on two resource units occupying VFR S2' in slots T1 and T2. The ACK information for HARQ process H2 may be sent on two resource units occupying VFR S3' in slots T1 and T2. The remaining 2K−6 resource units may be used for data.

In one design, the CQI and ACK information for three HARQ processes H1, H2 and H3 may be sent on eight resource units for the data segment as shown by a structure 746. In this design, the CQI information may be sent on two resource units occupying VFR S1' in slots T1 and T2. The ACK information for HARQ process H1 may be sent on two resource units occupying VFR S2' in slots T1 and T2. The ACK information for HARQ process H2 may be sent on two resource units occupying VFR S3' in slots T1 and T2. The ACK information for HARQ process H3 may be sent on two resource units occupying VFR S4' in slots T1 and T2. The remaining 2K−8 resource units may be used for data.

FIGS. 7A through 7D show specific designs of control channel structures for sending CQI and ACK information in the control segment and the data segment. These designs show specific mapping of CQI and/or ACK information to resource units available to send control information. The CQI and ACK information may also be mapped to the available resource units in various other manners. As an example, instead of using structure 714 in FIG. 7A, the ACK information for HARQ process H1 may be sent on (i) the upper left and lower right resource units in the matrix, (ii) the lower left and upper right resource units in the matrix, (iii) the upper left and lower left resource units in the matrix, etc. As another example, a block code may be used for all of the control information being sent, and the resultant codeword may be sent on all of the available resource units.

The CQI and ACK information may be multiplexed in various manners, e.g., using time division multiplexing (TDM), frequency division multiplexing (FDM), code division multiplexing (CDM), etc., or a combination thereof. In the designs shown in FIGS. 7A through 7D, a combination of TDM and FDM may be used for the control channel. In these designs, each VFR may correspond to a set of subcarriers. For example, 12 subcarriers may be allocated for the control segment, each VFR may correspond to six subcarriers, and one resource unit may correspond to six subcarriers in L symbol periods for one slot. CQI or ACK information for each HARQ process may be sent in the assigned resource unit(s), e.g., as shown in FIGS. 7A through 7D.

TDM may also be used for the control information. In this case, all control information mapped to a given slot may be processed (e.g., jointly encoded) and sent on all subcarriers for the control channel in that slot. As an example, for structure 726 in FIG. 7B, the CQI and ACK information for HARQ process H1 may be processed and sent on all subcarriers in slot T1, and the ACK information for HARQ processes H2 and H3 may be processed and sent on all subcarriers in slot T2.

FDM may also be used for the control information. In this case, all control information mapped to a given VFR may be processed (e.g., jointly encoded) and sent on all subcarriers in that VFR over two slots. As an example, for structure 726 in FIG. 7B, the CQI and ACK information for HARQ process H2 may be processed and sent on the subcarriers in VFR S1 over both slots T1 and T2, and the ACK information for HARQ processes H1 and H3 may be processed and sent on all subcarriers in VFR S2 over both slots T1 and T2.

CDM may also be used for the control information. In this case, the CQI and ACK information may be spread with orthogonal codes, combined, and then mapped to all resources available to send control information.

The control information may also be sent by varying the modulation order. For example, BPSK may be used to send one bit of control information, QPSK may be used to send two information bits, 8-PSK may be used to send three information bits, 16-QAM may be used to send four information bits, etc.

The designs in FIGS. 7A through 7D assume two types of control information being sent—CQI and ACK information. In general, any number and any type of control information may be sent on the control channel. For example, the control information may comprise information identifying one or more desired subbands among all subbands, information for one or more precoding/beamforming matrices or one or more antennas for MIMO transmission, a resource request, etc. In general, a fixed or variable amount of control information may be sent for each type. The amount of ACK information may be dependent on the number of HARQ processes being acknowledged. The amount of CQI information may be fixed (as shown in FIGS. 7A through 7D) or variable (e.g., dependent on whether or not MIMO is used, the number of streams being sent using MIMO, etc.).

The designs in FIGS. 7A through 7D assume that the control channel includes (i) a fixed number of resource units when data is not being sent and (ii) a variable number of resource units when data is being sent. In general, the control channel may include (i) a fixed or variable number of resource units when data is not being sent and (ii) a fixed or variable number of resource units when data is being sent. The number of resource units available for the control channel may be different than shown in FIG. 7A through 7D.

In general, the variable control channel may have different structures depending on one or more of the following:
System configuration, e.g., allocations for the downlink and uplink such as the number of downlink subframes and the number of uplink subframes,
UE configuration, e.g., the downlink and uplink subframes applicable for the UE,
The amount of resources available for the control channel,
The type(s) of control information being sent on the control channel, e.g., CQI and/or ACK information,
The amount of control information being sent for each type, e.g., the number of HARQ processes being acknowledged,
Whether or not data is being sent, which may determine the size and location of the control channel, and
The desired reliability for each type of control information.

The variable control channel may support transmission of one or more types of control information with a variable amount of resources. Different structures for mapping control information to control channel resources may be used depending on various factors such as those given above. The structure of the control channel may thus be varied depending on the various factors.

FIG. 8 shows a design of a process 800 for sending control information. Process 800 may be performed by a UE for the uplink (e.g., as described above) or by a Node B for the downlink. At least one type of control information being sent may be determined (block 812). The control information being sent may comprise only CQI information, only ACK information, both CQI and ACK information, and/or other types of control information. A structure of a control channel may be determined based on operating configuration and/or the factors noted above (block 814). The operating configuration may be determined based on system configuration (e.g., asymmetry of downlink and uplink allocations), UE configuration (e.g., applicable downlink and uplink subframes), etc. A plurality of structures may be supported for the control channel, some examples of which are given in FIGS. 7A through 7D. One of the supported structures may be selected based on the operating configuration and/or other factors. The control channel may comprise (i) a fixed amount of resources from a control segment if data is not being sent or (ii) a variable amount of resources from a data segment if data is being sent. The control and data segments may occupy different frequency locations.

The at least one type of control information may be mapped to resources for the control channel based on the structure (block 816). The control channel resources may comprise time resources, frequency resources, code resources, etc., or any combination thereof. Each type of control information may be mapped to a respective portion of the control channel resources based on the structure. Only CQI information may be sent and may be mapped to all of the control channel resources, e.g., as shown by structure 720 in FIG. 7B and structure 740 in FIG. 7D. Only ACK information may be sent and may be mapped to all of the control channel resources, e.g., as shown by structures 712 to 716 in FIG. 7A and structures 732 to 736 in FIG. 7C. Both CQI and ACK information may be sent and may be mapped to the resources for the control channel based on the structure, e.g., as shown by structures 722 to 726 in FIG. 7B and structures 742 to 746 in FIG. 7D.

FIG. 9 shows a design of an apparatus 900 for sending control information. Apparatus 900 includes means for determining at least one type of control information being sent (module 912), means for determining a structure of a control channel based on operating configuration (e.g., asymmetry of downlink and uplink allocations) and/or other factors (module 914), and means for mapping the at least one type of control information to resources for the control channel based on the structure (module 916).

FIG. 10 shows a design of a process 1000 for receiving control information. Process 1000 may be performed by a Node B for the uplink (e.g., as described above) or by a UE for the downlink. At least one type of control information being received may be determined (block 1012). A structure of a control channel may be determined based on operating configuration, which may indicate asymmetry of downlink and uplink allocations, and/or other factors (block 1014). The at least one type of control information may be received from resources for the control channel based on the structure (block 1016). For example, CQI information, or ACK information, or both CQI and ACK information may be received from the resources for the control channel based on the structure.

FIG. 11 shows a design of an apparatus 1100 for receiving control information. Apparatus 1100 includes means for determining at least one type of control information being received (module 1112), means for determining a structure of a control channel based on operating configuration and/or other factors (module 1114), and means for receiving the at least one type of control information from resources for the control channel based on the structure (module 1116).

The modules in FIGS. 9 and 11 may comprise processors, electronics devices, hardware devices, electronics components, logical circuits, memories, etc., or any combination thereof.

Figure 12:
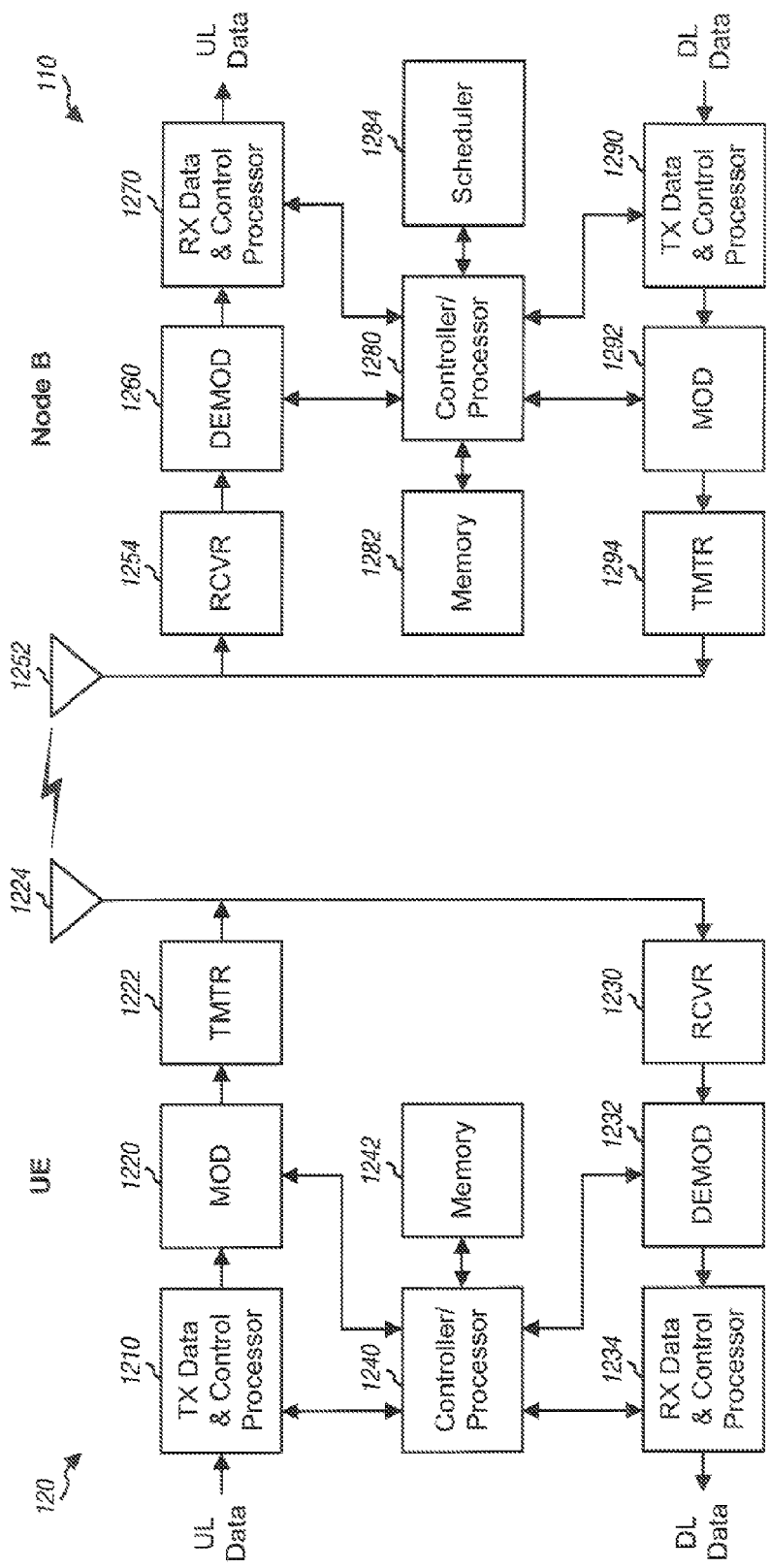
FIG. 12 shows a block diagram of a Node B and a UE.

FIG. 12 shows a block diagram of a design of a Node B 110 and a UE 120, which are one of the Node Bs and one of the UEs in FIG. 1. At UE 120, a transmit (TX) data and control processor 1210 may receive uplink (UL) data from a data source (not shown) and/or control information from a controller/processor 1240. Processor 1210 may process (e.g., format, encode, interleave, and symbol map) the data and control information and provide modulation symbols. A modulator (MOD) 1220 may process the modulation symbols as described below and provide output chips. A transmitter (TMTR) 1222 may process (e.g., convert to analog, amplify, filter, and frequency upconvert) the output chips and generate an uplink signal, which may be transmitted via an antenna 1224.

At Node B 110, an antenna 1252 may receive the uplink signals from UE 120 and other UEs and may provide a received signal to a receiver (RCVR) 1254. Receiver 1254 may condition (e.g., filter, amplify, frequency downconvert, and digitize) the received signal and provide received samples. A demodulator (DEMOD) 1260 may process the received samples as described below and provide demodulated symbols. A receive (RX) data and control processor 1270 may process (e.g., symbol demap, deinterleave, and decode) the demodulated symbols to obtain decoded data and control information for UE 120 and other UEs.

On the downlink, at Node B 110, downlink (DL) data and control information to be sent to the UEs may be processed by a TX data and control processor 1290, modulated by a modulator 1292 (e.g., for OFDM), conditioned by a transmitter 1294, and transmitted via antenna 1252. At UE 120, the downlink signals from Node B 110 and possibly other Node Bs may be received by antenna 1224, conditioned by a receiver 1230, demodulated by a demodulator 1232 (e.g., for OFDM), and processed by an RX data and control processor 1234 to recover the downlink data and control information sent by Node B 110 to UE 120. In general, the processing for uplink transmission may be similar to or different from the processing for downlink transmission.

Controllers/processors 1240 and 1280 may direct the operations at UE 120 and Node B 110, respectively. Memories 1242 and 1282 may store data and program codes for UE 120 and Node B 110, respectively. A scheduler 1284 may schedule UEs for downlink and/or uplink transmission and may provide assignments of system resources (e.g., assignments of subcarriers for downlink and/or uplink) for the scheduled UEs.

Figure 13:
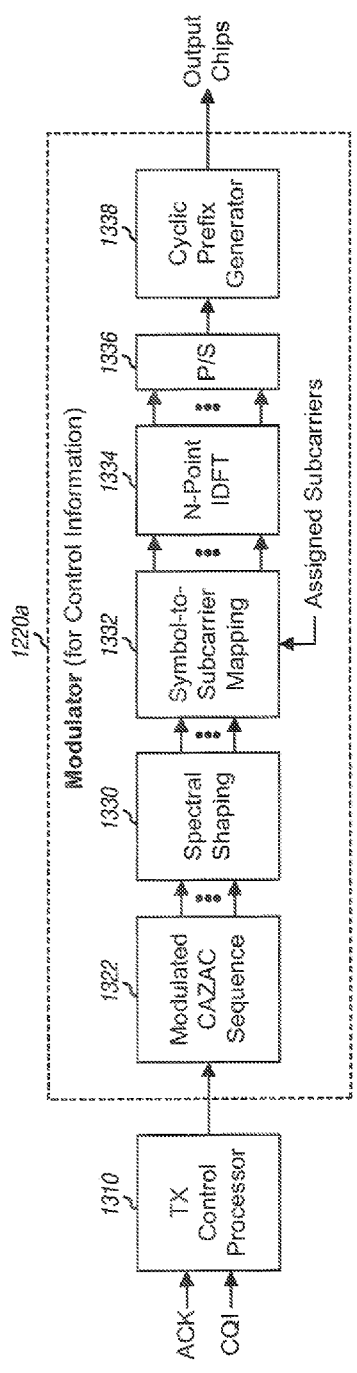
FIG. 13 shows a block diagram of a modulator for control information.

FIG. 13 shows a block diagram of a design of a modulator 1220a for control information. Modulator 1220a may be used for modulator 1220 at UE 120 in FIG. 12 when data is not sent.

A TX control processor 1310, which may be part of TX data and control processor 1210 in FIG. 12, may receive and process CQI and/or ACK information to be sent in a subframe. In one design, if only ACK information is being sent in a given slot, then TX control processor 1310 may generate a modulation symbol for the ACK/NAK for each HARQ process, e.g., by mapping an ACK to one QPSK value (e.g., 1+j)

and a NAK to another QPSK value (e.g., −1−j). Processor 1310 may then repeat the QPSK symbol for each HARQ process to obtain L modulation symbols for L symbol periods in one slot and may provide one modulation symbol in each symbol period. If only CQI information is being sent in a given slot, then TX control processor 1310 may encode the CQI information based on a block code to obtain code bits, map the code bits to L modulation symbols, and provide one modulation symbol in each symbol period. If both CQI and ACK information is being sent in a given slot, then TX control processor 1310 may encode the CQI and ACK information jointly based on another block code to obtain code bits, map the code bits to L modulation symbols, and provide one modulation symbol in each symbol period. In another design, processor 1310 may process the CQI and ACK information separately and may provide two modulation symbols for CQI and ACK for the two VFRs S1 and S2 in each symbol period, e.g., as shown in FIGS. 7A and 7B. TX control processor 1310 may also generate modulation symbols for CQI and/or ACK in other manners.

Within modulator 1220*a*, a unit 1322 may receive the modulation symbols for CQI and/or ACK from TX control processor 1310, e.g., one or two modulation symbols in each symbol period. For each modulation symbol, unit 1322 may modulate a CAZAC (constant amplitude zero auto-correlation) sequence with that modulation symbol to obtain a corresponding modulated CAZAC sequence with modulated symbols. A CAZAC sequence is a sequence having good temporal characteristics (e.g., a constant time-domain envelope) and good spectral characteristics (e.g., a flat frequency spectrum). Some example CAZAC sequences include a Chu sequence, a Zadoff-Chu sequence, a Frank sequence, a generalized chirp-like (GCL) sequence, a Golomb sequence, P1, P3, P4 and Px sequences, etc., which are known in the art. In each symbol period, unit 1322 may provide M modulated symbols for the M subcarriers in the control segment assigned to UE 120.

A spectral shaping unit 1330 may perform spectral shaping on the M modulated symbols in each symbol period and provide M spectrally shaped symbols. A symbol-to-subcarrier mapping unit 1332 may map the M spectrally shaped symbols to the M subcarriers in the control segment assigned to UE 120 and may map zero symbols with signal value of zero to the remaining subcarriers. An inverse discrete Fourier transform (IDFT) unit 1334 may receive N mapped symbols for the N total subcarriers from mapping unit 1332, perform an N-point IDFT on these N symbols to transform the symbols from the frequency domain to the time domain, and provide N time-domain output chips. Each output chip is a complex value to be transmitted in one chip period. A parallel-to-serial converter (P/S) 1336 may serialize the N output chips and provide a useful portion of an SC-FDM symbol. A cyclic prefix generator 1338 may copy the last C output chips of the useful portion and append these C output chips to the front of the useful portion to form an SC-FDM symbol containing N+C output chips. The cyclic prefix is used to combat inter-symbol interference (ISI) caused by frequency selective fading. The SC-FDM symbol may be sent in one SC-FDM symbol period, which may be equal to N+C chip periods.

Figure 14:
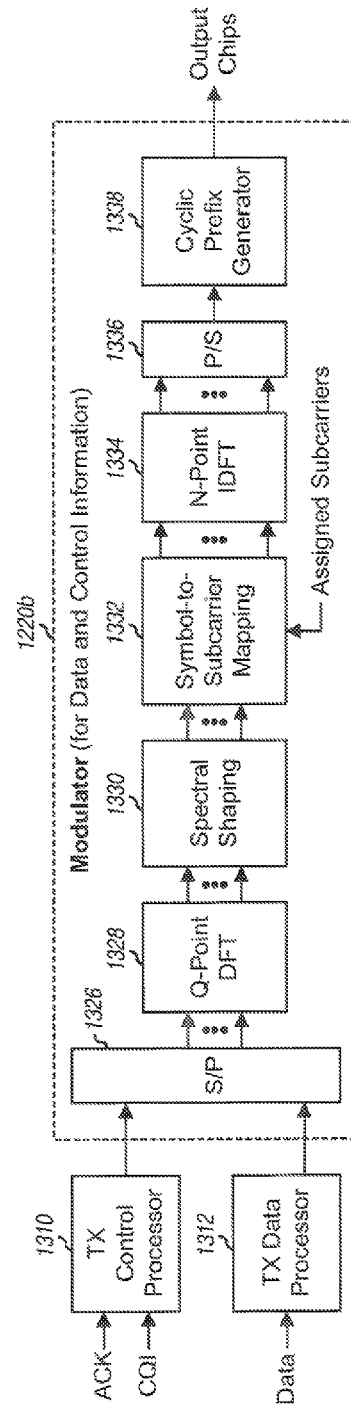
FIG. 14 shows a block diagram of a modulator for data and control information.

FIG. 14 shows a block diagram of a design of a modulator 1220*b* for data and control information. Modulator 1220*b* may be used for modulator 1220 in FIG. 12 when data is sent. TX control processor 1310 may process control information and provide modulation symbols for control information to modulator 1220*b*. A TX data processor 1312, which may be part of TX data and control processor 1210 in FIG. 12, may receive data to send, encode the data based on a coding scheme to obtain code bits, interleave the code bits, and map the interleaved bits to modulation symbols based on a modulation scheme.

Within modulator 1220*b*, a serial-to-parallel converter (S/P) 1326 may receive the modulation symbols from TX control processor 1310 and the modulation symbols from TX data processor 1312. S/P 1326 may provide Q modulation symbols in each symbol period, where Q is the number of subcarriers in the data segment assigned to UE 120. A discrete Fourier transform (DFT) unit 1328 may perform a Q-point DFT on the Q modulation symbols to transform these symbols from the time domain to the frequency domain and may provide Q frequency-domain symbols. Spectral shaping unit 1330 may perform spectral shaping on the Q frequency-domain symbols and provide Q spectrally shaped symbols. Symbol-to-subcarrier mapping unit 1332 may map the Q spectrally shaped symbols to the Q subcarriers in the data segment and may map zero symbols to the remaining subcarriers. IDFT unit 1334 may perform an N-point IDFT on the N mapped symbols from unit 1332 and provide N time-domain output chips. P/S 1336 may serialize the N output chips, and cyclic prefix generator 1338 may append a cyclic prefix to form an SC-FDM symbol containing N+C output chips.

FIGS. 13 and 14 show example designs for sending control information without and with data, respectively. Control information may also be sent in various other manners. In another design, when only control information is sent, CQI and/or ACK information may be encoded separately, multiplexed, transformed with a DFT, and mapped to subcarriers for the control segment, similar to the design shown in FIG. 14. In another design, CQI and/or ACK information may be jointly encoded, multiplexed, transformed with a DFT, and mapped to subcarriers for the control segment. Control information may also be sent with data based on other designs beside the design shown in FIG. 14.

In the designs shown in FIGS. 13 and 14, control information may be processed based on a first processing scheme when data is not sent and based on a second processing scheme when data is sent. When sent alone, control information may be sent using a CAZAC sequence to achieve a lower PAR. When sent with data, control information may be multiplexed with data and processed in similar manner as data. Control information may also be processed in other manners. For example, control information may be sent using CDM, e.g., by spreading each modulation symbol for control information with an orthogonal code and mapping the spread modulation symbols to the resources for the control channel.

Figure 15:
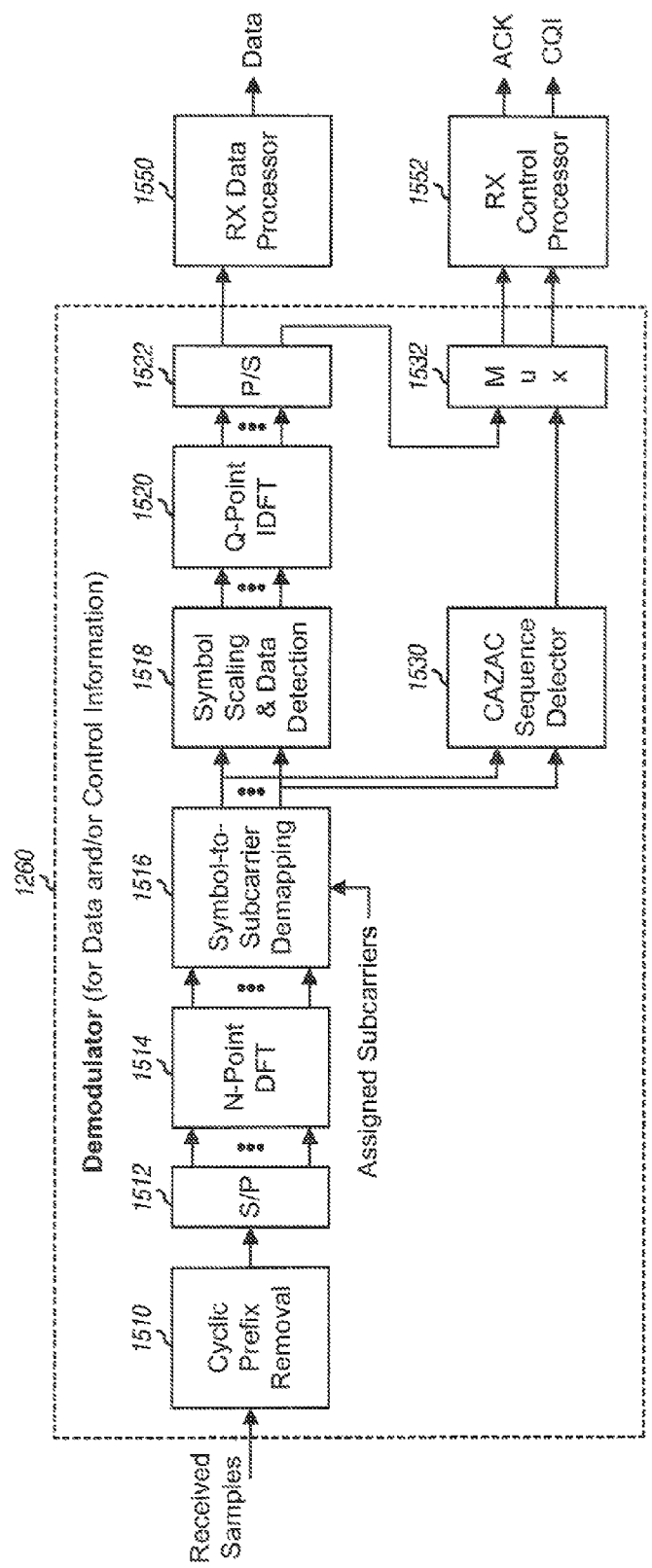
FIG. 15 shows a block diagram of a demodulator.

FIG. 15 shows a block diagram of a design of demodulator 1260 at Node B 110 in FIG. 12. Within demodulator 1260, a cyclic prefix removal unit 1510 may obtain received samples in each SC-FDM symbol period, remove C received samples corresponding to the cyclic prefix, and provide N received samples for the useful portion of a received SC-FDM symbol. An S/P 1512 may provide the N received samples in parallel. A DFT unit 1514 may perform an N-point DFT on the N received samples and provide N received symbols for the N total subcarriers. These N received symbols may contain data and control information for all UEs transmitting to Node B 110. The processing to recover control information and/or data from UE 120 is described below.

If control information and data are sent by UE 120, then a symbol-to-subcarrier demapping unit 1516 may provide Q received symbols from the Q subcarriers for the data segment assigned to UE 120 and may discard the remaining received symbols. A unit 1518 may scale the Q received symbols based on the spectral shaping performed by UE 120. Unit 1518 may further perform data detection (e.g., matched filtering, equalization, etc.) on the Q scaled symbols with channel gain estimates and provide Q detected symbols. An IDFT unit 1520 may perform a Q-point IDFT on the Q detected symbols and provide Q demodulated symbols for data and control information. A P/S 1522 may provide demodulated symbols for data to an RX data processor 1550 and may provide demodulated symbols for control information to a multiplexer (Mux) 1532, which may provide these symbols to an RX control processor 1552. Processors 1550 and 1552 may be part of RX data and control processor 1270 in FIG. 12. RX data processor 1550 may process (e.g., symbol demap, deinterleave, and decode) the demodulated symbols for data and provide decoded data. RX control processor 1552 may process the demodulated symbols for control information and provide decoded control information, e.g., CQI and/or ACK.

If control information and no data is sent by UE 120, then symbol-to-subcarrier demapping unit 1516 may provide M received symbols from the M subcarriers for the control segment assigned to UE 120 and may discard the remaining received symbols. A CAZAC sequence detector 1530 may detect one or more modulation symbols most likely to have been sent in a symbol period based on the M received symbols for that symbol period. Detector 1530 may provide demodulated symbols for control information, which may be routed through multiplexer 1532 and provided to RX control processor 1552.

It is understood that the specific order or hierarchy of steps in the processes disclosed is an example of exemplary approaches. Based upon design preferences, it is understood that the specific order or hierarchy of steps in the processes may be rearranged while remaining within the scope of the disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   at least one processor configured to:
   determine at least one type of control information being sent for a subframe of a plurality of subframes, to determine a structure of a control channel for the subframe, the structure defining how each type of control information is mapped to a set of virtual frequency resources for the subframe,
      wherein the set of virtual frequency resources spans a predetermined number M of contiguous subcarriers of an uplink carrier comprising N total subcarriers, where M is less than N,
      wherein the structure is selected from a plurality of structures according to the at least one type of control information, and
      wherein each of the plurality of structures maps one or more types of control information to the set of virtual frequency resources for the subframe;
   map each of the at least one type of control information to a designated portion of the set of virtual frequency resources for the subframe for the control channel based on the structure; and
   map the set of virtual frequency resources of the control channel to physical resources of an uplink carrier for the subframe, wherein the mapping the set of virtual frequency resources to the physical resources of the uplink carrier comprises mapping the set of virtual frequency resources to a control segment formed at an edge of a system bandwidth of the uplink carrier; and
   a memory coupled to the at least one processor.

2. The apparatus of claim 1, wherein at least one processor is configured to determine the structure of the control channel further based on system configuration, or user equipment (UE) configuration, or both.

3. The apparatus of claim 2, wherein the system configuration is indicative of allocations for downlink and uplink, and wherein the at least one processor is configured to determine the structure of the control channel based on asymmetry of the downlink and uplink allocations.

4. The apparatus of claim 2, wherein the at least one processor is configured to determine the structure of the control channel based on number of subframes allocated for downlink and number of subframes allocated for uplink as indicated by the system configuration.

5. The apparatus of claim 1, wherein the at least one processor is configured to determine the structure of the control channel further based on an amount of control information for each type of control information being sent.

6. The apparatus of claim 1, wherein the at least one type of control information being sent comprises acknowledgement (ACK) information, and wherein the at least one processor is configured to determine the structure of the control channel further based on number of hybrid automatic retransmission (HARQ) processes to be acknowledged by the ACK information.

7. The apparatus of claim 1, wherein the at least one type of control information being sent comprises channel quality indicator (CQI) and acknowledgement (ACK) information, and wherein the at least one processor is configured to map CQI information to a first portion of the set of virtual frequency resources for the control channel and to map ACK information to a second portion of the set of virtual frequency resources for the control channel.

8. The apparatus of claim 1, wherein the at least one type of control information being sent comprises only channel quality indicator (CQI) information, and wherein the at least one processor is configured to map the CQI information to all of the set of virtual frequency resources for the control channel.

9. The apparatus of claim 1, wherein the at least one type of control information being sent comprises only acknowledgement (ACK) information, and wherein the at least one processor is configured to map the ACK information to all of the set of virtual frequency resources for the control channel.

10. The apparatus of claim 1, wherein the at least one type of control information being sent comprises channel quality indicator (CQI) and acknowledgement (ACK) information, and wherein the at least one processor is configured to map the CQI and ACK information to the set of virtual frequency resources for the control channel based on the structure.

11. The apparatus of claim 1, wherein the at least one processor is configured to process the at least one type of control information to obtain modulation symbols, to modulate a CAZAC (constant amplitude zero auto-correlation) sequence with each of the modulation symbols to obtain a corresponding modulated CAZAC sequence, and to map modulated CAZAC sequences for the modulation symbols to the set of virtual frequency resources for the control channel.

12. A method implemented in an apparatus, comprising:
determining at least one type of control information being sent for a subframe of a plurality of subframes;
determining a structure of a control channel for the subframe, the structure defining how each type of control information is mapped to a set of virtual frequency resources for the subframe,
wherein the set of virtual frequency resources spans a predetermined number M of contiguous subcarriers of an uplink carrier comprising N total subcarriers, where M is less than N,
wherein the structure is selected from a plurality of structures according to the at least one type of control information, and
wherein each of the plurality of structures maps one or more types of control information to the set of virtual frequency resources for the subframe;
mapping each of the at least one type of control information to a designated portion of the set of virtual frequency resources for the control channel for the subframe based on the structure; and
mapping the set of virtual frequency resources of the control channel to physical resources of an uplink carrier for the subframe, wherein the mapping the set of virtual frequency resources to the physical resources of the uplink carrier comprises mapping the set of virtual frequency resources to a control segment formed at an edge of a system bandwidth of the uplink carrier.

13. The method of claim 12, wherein the determining the structure of the control channel is further based on system configuration, or user equipment (UE) configuration, or both, wherein the system configuration is indicative of allocations for downlink and uplink, and wherein the determining the structure of the control channel comprises determining the structure of the control channel based on asymmetry of the downlink and uplink allocations.

14. The method of claim 12, wherein the at least one type of control information being sent comprises acknowledgement (ACK) information, and wherein the determining the structure of the control channel comprises determining the structure of the control channel further based on number of hybrid automatic retransmission (HARQ) processes to be acknowledged by the ACK information.

15. The method of claim 12, wherein the at least one type of control information being sent comprises only channel quality indicator (CQI) information, or only acknowledgement (ACK) information, or both CQI and ACK information, and wherein the mapping the at least one type of control information comprises mapping the CQI information, or the ACK information, or both the CQI and ACK information to the set of virtual frequency resources for the control channel based on the structure.

16. An apparatus comprising:
means for determining at least one type of control information being sent for a subframe of a plurality of subframes;
means for determining a structure of a control channel for the subframe, the structure defining how each type of control information is mapped to a set of virtual frequency resources for the subframe,
wherein the set of virtual frequency resources spans a predetermined number M of contiguous subcarriers of an uplink carrier comprising N total subcarriers, where M is less than N,
wherein the structure is selected from a plurality of structures according to the at least one type of control information, and
wherein each of the plurality of structures maps one or more types of control information to the set of virtual frequency resources for the subframe;
means for mapping each of the at least one type of control information to a designated portion of the set of virtual frequency resources for the control channel for the subframe based on the structure; and
means for mapping the set of virtual frequency resources of the control channel to physical resources of an uplink carrier for the subframe, wherein the mapping the set of virtual frequency resources to the physical resources of the uplink carrier comprises mapping the set of virtual frequency resources to a control segment formed at an edge of a system bandwidth of the uplink carrier.

17. The apparatus of claim 16, wherein the means for determining the structure of the control channel determines the structure of the control channel further based on system configuration, or user equipment (UE) configuration, or both, wherein the system configuration is indicative of allocations for downlink and uplink, and wherein the means for determining the structure of the control channel comprises means for determining the structure of the control channel based on asymmetry of the downlink and uplink allocations.

18. The apparatus of claim 16, wherein the at least one type of control information being sent comprises acknowledgement (ACK) information, and wherein the means for determining the structure of the control channel comprises means for determining the structure of the control channel further based on number of hybrid automatic retransmission (HARQ) processes to be acknowledged by the ACK information.

19. The apparatus of claim 16, wherein the at least one type of control information being sent comprises only channel quality indicator (CQI) information, or only acknowledgement (ACK) information, or both CQI and ACK information, and wherein the means for mapping the at least one type of control information comprises means for mapping the CQI information, or the ACK information, or both the CQI and ACK information to the set of virtual frequency resources for the control channel based on the structure.

20. A non-transitory machine-readable medium comprising instructions which, when executed by a machine, cause the machine to perform operations including:
   determining at least one type of control information being sent for a subframe of a plurality of subframes;
   determining a structure of a control channel for the subframe, the structure defining how each type of control information is mapped to a set of virtual frequency resources for the subframe,
      wherein the set of virtual frequency resources spans a predetermined number M of contiguous subcarriers of an uplink carrier comprising N total subcarriers, where M is less than N,
      wherein the structure is selected from a plurality of structures according to the at least one type of control information, and
      wherein each of the plurality of structures maps one or more types of control information to the set of virtual frequency resources for the subframe;
   mapping each of the at least one type of control information to a designated portion of the set of virtual frequency resources for the control channel for the subframe based on the structure; and
   mapping the set of virtual frequency resources of the control channel to physical resources of an uplink carrier for the subframe, wherein the mapping the set of virtual frequency resources to the physical resources of the uplink carrier comprises mapping the set of virtual frequency resources to a control segment formed at an edge of a system bandwidth of the uplink carrier.

21. The non-transitory machine-readable medium of claim 20, wherein the machine-readable medium further comprises instructions which, when executed by a machine, cause the machine to perform operations including:
   determining the structure of the control channel further based on system configuration, or user equipment (UE) configuration, or both, wherein asymmetry of allocations for downlink and uplink is indicated by the system configuration.

22. An apparatus comprising:
   at least one processor configured to:
      determine at least one type of control information being received for a subframe of a plurality of subframes,
      determine a structure of a control channel of a plurality of subframes, the structure defining how each type of control information is mapped to a set of virtual frequency resources for the subframe,
         wherein the set of virtual frequency resources spans a predetermined number M of contiguous subcarriers of an uplink carrier comprising N total subcarriers, where M is less than N,
         wherein the structure is selected from a plurality of structures according to the at least one type of control information, and
         wherein each of the plurality of structures maps one or more types of control information to the set of virtual frequency resources for the subframe;
      receive the set of virtual frequency resources of the control channel by de-mapping received physical resources of an uplink carrier for the subframe, wherein the de-mapping the received physical resources of the uplink carrier comprises de-mapping a control segment formed at an edge of a system bandwidth of the uplink carrier; and
      receive each of the at least one type of control information from a designated portion of the set of virtual frequency resources for the control channel for the subframe based on the structure; and
   a memory coupled to the at least one processor.

23. The apparatus of claim 22, wherein the at least one processor is configured to determine the structure of the control channel further based on system configuration, or user equipment (UE) configuration, or both, wherein the system configuration is indicative of allocations for downlink and uplink.

24. The apparatus of claim 22, wherein the at least one type of control information being received comprises acknowledgement (ACK) information, and wherein the at least one processor is configured to determine the structure of the control channel further based on number of hybrid automatic retransmission (HARQ) processes to be acknowledged by the ACK information.

25. The apparatus of claim 22, wherein the at least one type of control information being received comprises only channel quality indicator (CQI) information, or only acknowledgement (ACK) information, or both CQI and ACK information, and wherein the at least one processor is configured to receive the CQI information, or the ACK information, or both the CQI and ACK information from the set of virtual frequency resources for the control channel based on the structure.

26. A method implemented in an apparatus, comprising:
   determining at least one type of control information being received for a subframe of a plurality of subframes;
   determining a structure of a control channel for the subframe, the structure defining how each type of control information is mapped to a set of virtual frequency resources for the subframe,
      wherein the set of virtual frequency resources spans a predetermined number M of contiguous subcarriers of an uplink carrier comprising N total subcarriers, where M is less than N,
      wherein the structure is selected from a plurality of structures according to the at least one type of control information, and
      wherein each of the plurality of structures maps one or more types of control information to the set of virtual frequency resources for the subframe;

receiving the set of virtual frequency resources of the control channel by de-mapping received physical resources of an uplink carrier for the subframe, wherein the de-mapping the received physical resources of the uplink carrier comprises de-mapping the set of virtual frequency resources from a control segment formed at an edge of a system bandwidth of the uplink carrier; and receiving each of the at least one type of control information from a designated portion of the set of virtual frequency resources for the control channel for the subframe based on the structure.

27. The method of claim 26, wherein the determining the structure of the control channel comprises determining the structure of the control channel further based on system configuration, or user equipment (UE) configuration, or both, wherein the system configuration is indicative of allocations for downlink and uplink.

28. An apparatus comprising:
means for determining at least one type of control information being received for a subframe of a plurality of subframes;
means for determining a structure of a control channel for the subframe, the structure defining how each type of control information is mapped to a set of virtual frequency resources for the subframe,
  wherein the set of virtual frequency resources spans a predetermined number M of contiguous subcarriers of an uplink carrier comprising N total subcarriers, where M is less than N,
  wherein the structure is selected from a plurality of structures according to the at least one type of control information, and
  wherein each of the plurality of structures maps one or more types of control information to the set of virtual frequency resources for the subframe;
means for receiving the set of virtual frequency resources of the control channel by de-mapping received physical resources of an uplink carrier for the subframe, wherein the de-mapping the received physical resources of the uplink carrier comprises de-mapping the set of virtual frequency resources from a control segment formed at an edge of a system bandwidth of the uplink carrier; and
means for receiving each of the at least one type of control information from a designated portion of the set of virtual frequency resources for the control channel for the subframe based on the structure.

29. The apparatus of claim 28, wherein the means for determining the structure of the control channel determines the structure of the control channel further based on system configuration, or user equipment (UE) configuration, or both, wherein the system configuration is indicative of allocations for downlink and uplink.

30. The apparatus of claim 1, wherein the set of virtual frequency resources for the control channel are mapped to at least one set of contiguous subcarriers in at least one slot of the physical resources.

31. The apparatus of claim 1, wherein the at least one processor is configured to map the set of virtual frequency resources for the control channel to a first set of contiguous subcarriers in a first slot and a second set of contiguous subcarriers in a second slot of the physical resources.

32. The apparatus of claim 1, wherein the at least one processor is configured to map the set of virtual frequency resources for the control channel to all subcarriers within a control segment in at least one slot of the physical resources.

33. The method of claim 12, wherein the at least one processor is configured to map the set of virtual frequency resources for the control channel to at least one set of contiguous subcarriers in at least one slot of the physical resources.

34. The method of claim 12, wherein the set of virtual frequency resources for the control channel are mapped to a first set of contiguous subcarriers in a first slot and a second set of contiguous subcarriers in a second slot of the physical resources.

35. The method of claim 12, wherein the set of virtual frequency resources for the control channel are mapped to all subcarriers within a control segment in at least one slot of the physical resources.

36. A non-transitory machine-readable medium comprising instructions which, when executed by a machine, cause the machine to perform operations including:
determining at least one type of control information being received for a subframe of a plurality of subframes;
determining a structure of a control channel for the subframe, the structure defining how each type of control information is mapped to a set of virtual frequency resources for the subframe,
  wherein the set of virtual frequency resources spans a predetermined number M of contiguous subcarriers of an uplink carrier comprising N total subcarriers, where M is less than N,
  wherein the structure is selected from a plurality of structures according to the at least one type of control information, and
  wherein each of the plurality of structures maps one or more types of control information to the set of virtual frequency resources for the subframe;
receiving the set of virtual frequency resources of the control channel by de-mapping received physical resources of an uplink carrier for the subframe, wherein the de-mapping the received physical resources of the uplink carrier comprises de-mapping the set of virtual frequency resources from a control segment formed at an edge of a system bandwidth of the uplink carrier; and
receiving each of the at least one type of control information from a designated portion of the set of virtual frequency resources for the control channel for the subframe based on the structure.

37. The apparatus of claim 1, wherein a modulation order for a modulation symbol mapped to the set of virtual frequency resources is determined based on a number of bits of the control information.

38. The apparatus of claim 37, wherein the at least one processor is further configured to repeat the modulation symbol for each of L symbol periods of the control channel for the subframe.

39. The apparatus of claim 1, wherein the at least one type of control information being sent comprises channel quality indicator (CQI) information, and wherein the at least one processor is configured to:
encode the CQI information using a block code to obtain code bits; and
map the code bits to L modulation symbols; and
map each of the L modulation symbols to the set of virtual frequency resources for one symbol period of the subframe.

40. The method of claim 12, wherein a modulation order for a modulation symbol mapped to the set of virtual frequency resources is determined based on a number of bits of the control information.

41. The method of claim 40, further comprising:
repeating the modulation symbol for each of L symbol periods of the control channel for the subframe.

42. The method of claim 12, wherein the at least one type of control information being sent comprises channel quality indicator (CQI) information, the method further comprising:
  encoding the CQI information using a block code to obtain code bits; and
  mapping the code bits to L modulation symbols; and
  mapping each of the L modulation symbols to the set of virtual frequency resources for one symbol period of the subframe.

* * * * *